(12) United States Patent
Thomson

(10) Patent No.: US 7,556,408 B2
(45) Date of Patent: Jul. 7, 2009

(54) EXHAUST TAILPIPE FLAME EFFECT DEVICE

(76) Inventor: Dion Thomson, 2551 Rumon Ct., Tallahassee, FL (US) 32304

( * ) Notice: Subject to any disclaimer, the term of this patent is extended or adjusted under 35 U.S.C. 154(b) by 329 days.

(21) Appl. No.: 11/455,620

(22) Filed: Jun. 19, 2006

(65) Prior Publication Data

US 2007/0291470 A1   Dec. 20, 2007

(51) Int. Cl.
*B60Q 1/00*   (2006.01)
(52) U.S. Cl. .......................... 362/459; 362/96
(58) Field of Classification Search ................ 362/459, 362/487, 96, 540, 549
See application file for complete search history.

(56) References Cited

U.S. PATENT DOCUMENTS

| 1,824,388 | A | 9/1931 | Birch |
| 2,167,249 | A | 7/1939 | McKeige |
| 2,620,764 | A | 12/1952 | Cook |
| 4,466,630 | A | 8/1984 | Larkin |
| 4,735,592 | A | 4/1988 | Griffin |
| 4,965,707 | A | 10/1990 | Butterfield |
| 5,523,925 | A | 6/1996 | Bare, IV |
| 6,454,425 | B1 | 9/2002 | Lin |
| 6,471,377 | B1 * | 10/2002 | Stegall ........................ 362/487 |
| 6,491,418 | B1 * | 12/2002 | Chen .......................... 362/487 |
| 6,582,108 | B1 | 6/2003 | Liang |
| 6,588,923 | B1 | 7/2003 | Shih |
| 6,623,134 | B1 | 9/2003 | Chang |
| 6,663,269 | B1 | 12/2003 | Leu |
| 2006/0092621 | A1 * | 5/2006 | Lai ............................. 362/96 |

* cited by examiner

*Primary Examiner*—Ali Alavi
(74) *Attorney, Agent, or Firm*—J. Wiley Horton

(57) ABSTRACT

A flame effect device for a vehicle including an exhaust pipe and an effect module. The effect module includes a fan, a light, and streamers. When the effect module is activated, the fan blows the streamers in front of the light creating a reflection on the inside face of the exhaust pipe. This reflection has the appearance of an emanating flame inside of the exhaust pipe. The preferred embodiment of the present invention includes a triggering device which causes the flame to appear more intense as the vehicle accelerates.

16 Claims, 11 Drawing Sheets

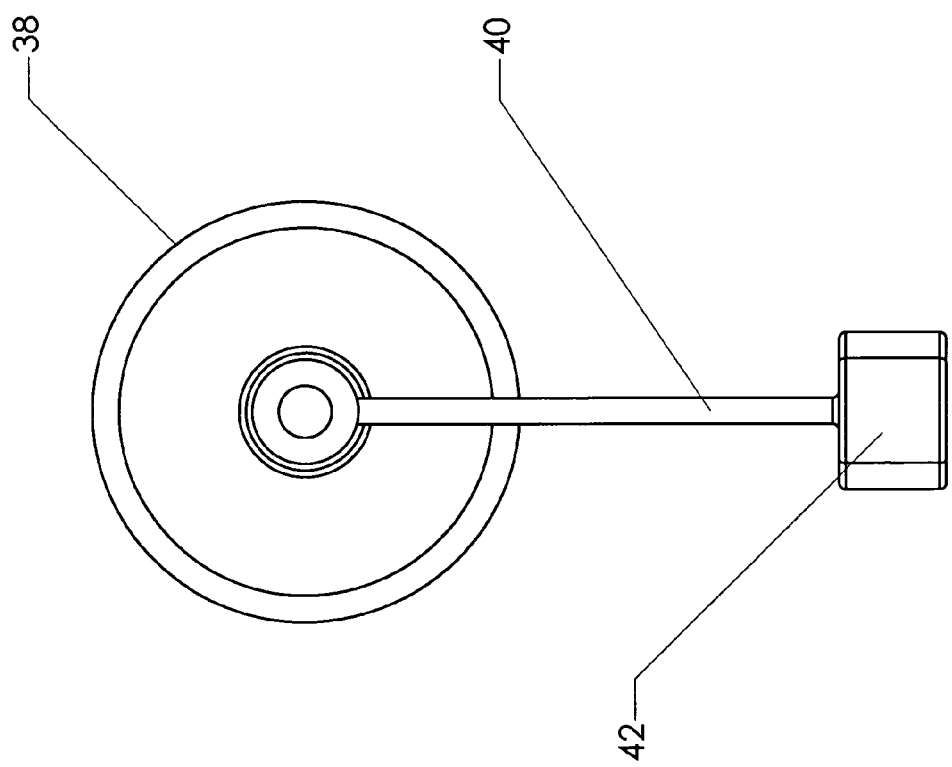

EXHAUST TAILPIPE FLAME EFFECT DEVICE

BACKGROUND OF THE INVENTION

1. Field of the Invention

This invention relates to the field of flame effect devices. More specifically, the invention comprises a flame effect device including a light, a fan, a reflective surface, and streamers for producing an effect of burning fuel.

2. Description of the Related Art

Many owners of automobiles and bikes desire to customize the appearance of their vehicles. The exhaust tailpipe is one particular component that has received significant attention in the area of customization. The exhaust tailpipe has been modified in many ways including the use of flame effects. It is generally illegal in most jurisdictions to have an actual fuel-burning exhaust tailpipe. Accordingly, many owners have had to settle for relatively facile light effects, such as a ring of LEDs (light emitting diodes) around the perimeter of the exhaust tailpipe. These effects do not generally provide a flame effect of realistic appearance. It is generally obvious to even the casual observer that there is in fact no flame in the exhaust of vehicles sporting these effect devices.

It is therefore desirable to provide a flame effect device that produces a realistic flame effect. As this exhaust is most often viewed from a slightly elevated position behind the rear of the vehicle, it is desirable that a viewer in this position cannot easily detect that the device is not in fact an actual emanating flame inside the exhaust tailpipe.

BRIEF SUMMARY OF THE INVENTION

The present invention is a flame effect device for a vehicle including an exhaust pipe and an effect module. The effect module includes a fan, a light, and streamers. When the effect module is activated, the fan blows the streamers in front of the light creating a reflection on the inside face of the exhaust pipe. This reflection has the appearance of an emanating flame inside of the exhaust pipe. The preferred embodiment of the present invention includes a triggering device which causes the flame to appear more intense as the vehicle accelerates.

BRIEF DESCRIPTION OF THE SEVERAL VIEWS OF THE DRAWINGS

FIG. 6A is front view, showing the triggering mechanism in the off position.

REFERENCE NUMERALS IN THE DRAWINGS

Figure 1:
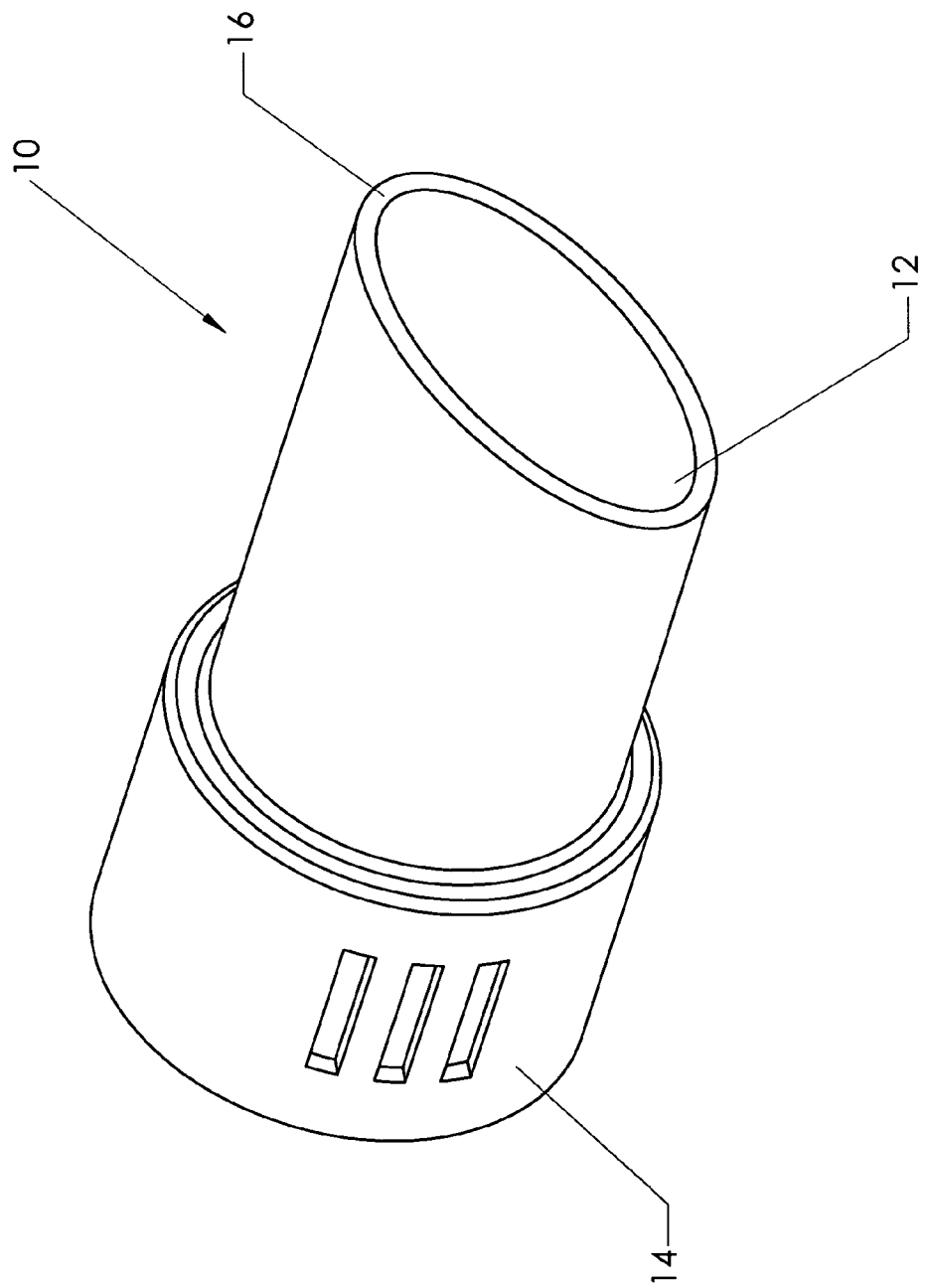
FIG. 1 is a perspective view, showing the present invention.

| | REFERENCE NUMERALS IN THE DRAWINGS | | |
|---|---|---|---|
| 10 | flame effect device | 12 | exhaust pipe |
| 14 | effect module | 16 | exhaust face |
| 18 | impeller | 20 | fan motor |
| 22 | light | 24 | vents |
| 26 | streamer mount | 28 | streamers |
| 30 | bumper | 32 | flame effect |
| 34 | pipe length | 36 | reflective interior |
| 38 | potentiometer | 40 | pendulum |
| 42 | mass | 44 | leads |
| 46 | power source | 48 | sleeve mount |
| 50 | exhaust mating edge | 52 | angular displacement |
| 54 | triggering mechanism | 56 | mount groove |
| 58 | dial | 60 | arm |
| 62 | vehicle tail pipe | 64 | tail pipe face |

DETAILED DESCRIPTION OF THE INVENTION

The external components of the present invention are shown in FIG. 1. Flame effect device 10 is generally composed of exhaust pipe 12 and effect module 14. In FIG. 1 exhaust pipe 12 and effect module 14 are two separate components which are attached together, such as by glue. Effect module 14 and exhaust pipe 12 could also be a single unitary component, however. Exhaust pipe 12 has exhaust face 16 on one end. As illustrated in FIG. 1, exhaust face 16 is preferably biased so that the top of exhaust face 16 tilts rearward. The purpose of this tilt will be explained subsequently.

Figure 2:
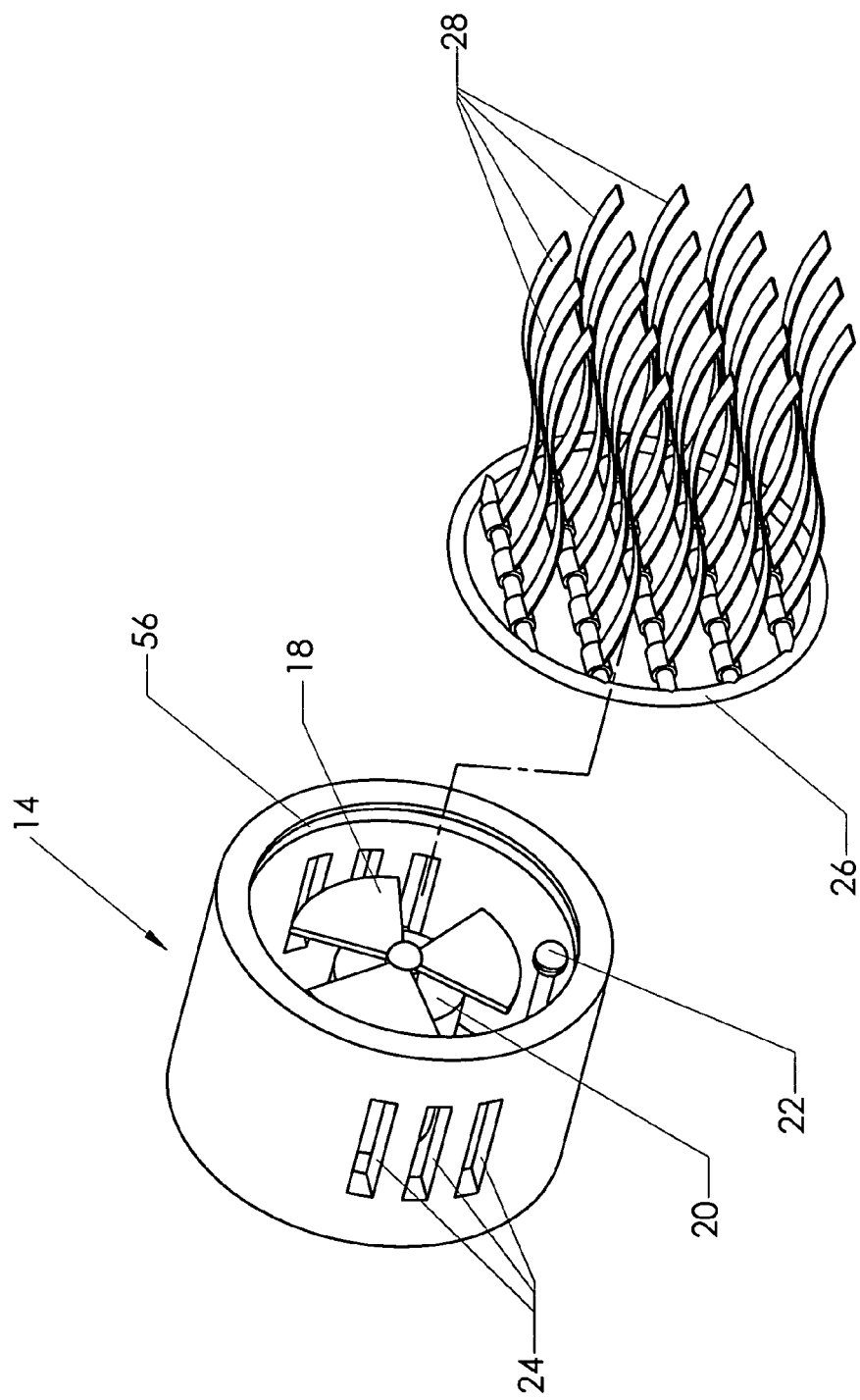
FIG. 2 is an exploded view, showing components of the present invention.

The internal components of the present invention are shown in FIG. 2. Effect module 14 generally includes a fan and light 22. The fan has fan motor 20 and impeller 18. Light 22 can be placed anywhere in effect module 14 as long as it does not interfere with the movement of impeller 18. Effect module 14 is provided with vents 24 which allow ambient air to enter into effect module 14. Streamer mount 26 is provided for attachment of streamers 28 to effect module 14. In the preferred embodiment, streamer mount 26 is an annular ring with members running from one side of the ring to the opposite side. Streamers 28 are preferably made of cloth or woven fabric, but other materials can also be used. In the preferred embodiment, streamers 28 are colored to common flame colors such as orange, yellow, red, or blue.

Those that are skilled in the art will know that streamer mount 26 can be attached to effect module 14 in a variety of ways. For example, as illustrated in FIG. 2, mount groove 56 can be provided on the inside surface of effect module 14. Also, streamer mount 26 can be glued to effect module 14 are can be glued to exhaust pipe 12. Other attachment mechanisms are known in the art and do not depart from the scope of the invention claimed herein.

Figure 3:
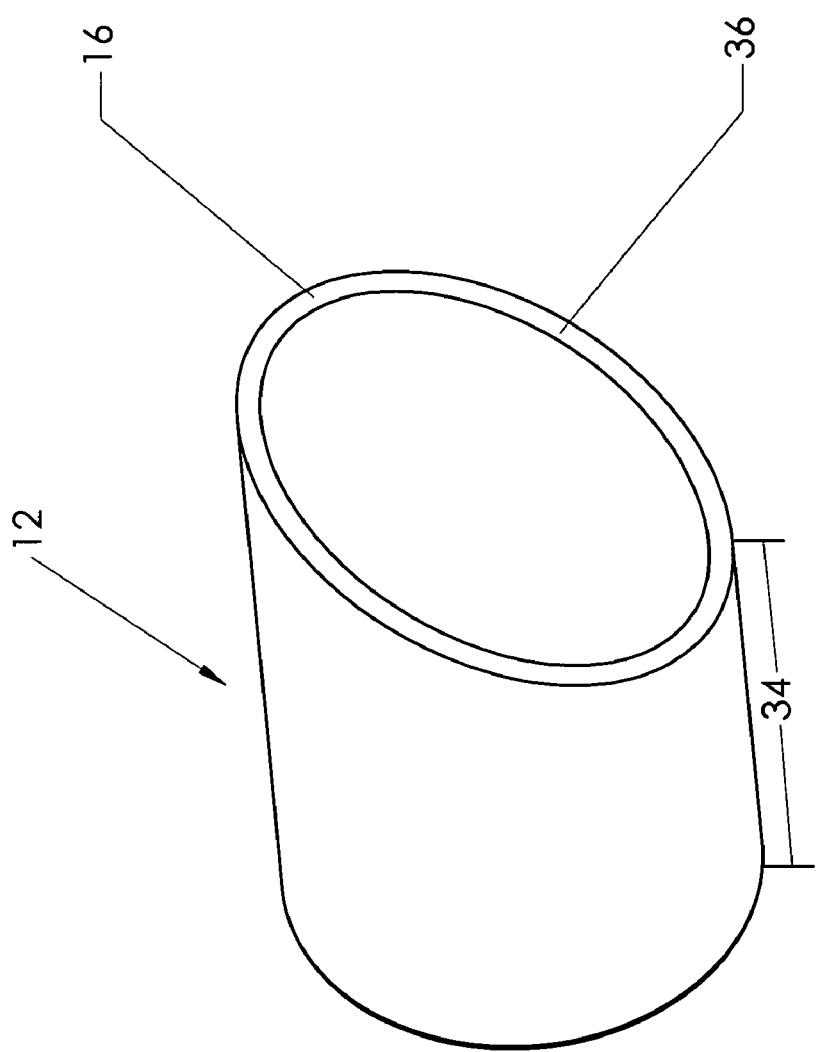
FIG. 3 is perspective view, showing an exhaust pipe.

The significant features of exhaust pipe 12 are better illustrated in FIG. 3. Exhaust pipe 12 is preferably cylindrical in shape to resemble an actual exhaust pipe. As described previously, exhaust face 16 is biased rearward so that pipe length 34 is shorter at the bottom than at the top. Pipe length 34 is preferably longer than streamers 28, so streamers 28 do not extend past exhaust face 16. Exhaust pipe 12 is provided with reflective interior 36 which helps create a realistic flame effect.

Figure 4:
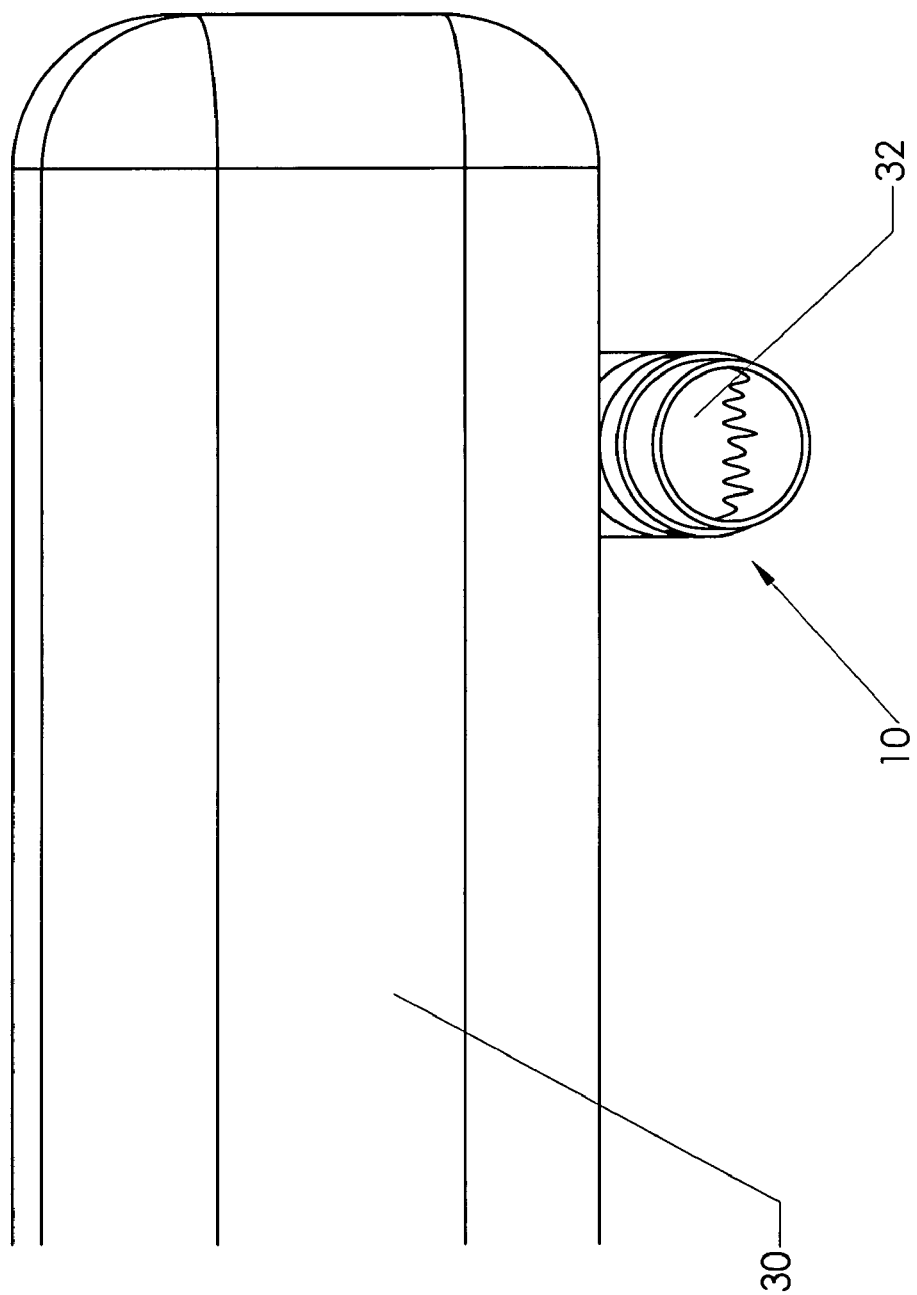
FIG. 4 is a perspective view, showing the present invention in use.

The present invention is shown in use in FIG. 4. Flame effect device 10 is generally attached to the vehicle under bumper 30. Flame effect device 10 is most often viewed from behind the car from a position of higher elevation than flame effect device 10. This viewing perspective, as shown in FIG. 4, allows the viewer to see slightly inside flame effect device 10. The tilt of exhaust face 16 also serves to limit the amount of the inside of flame effect device 10 a viewer can see from the aforementioned viewing perspective.

The viewer sees flame effect 32 inside of fire effect device 10 when the device is activated. Flame effect 32 is created by the combination of light and the movement of color being reflected from a curved surface. The movement of color is provided by the fan blowing streamers 28. The reader will appreciate that flame effect 32 appears as a reflection on reflective interior 36 and the viewer does not actually see streamers 28 or light 22. This feature makes flame effect 32 appear more like a real flame. Accordingly, it is desirable for streamers 28 to be short enough that they cannot be seen by the viewer when the viewer is in the normal viewing position.

Figure 5:
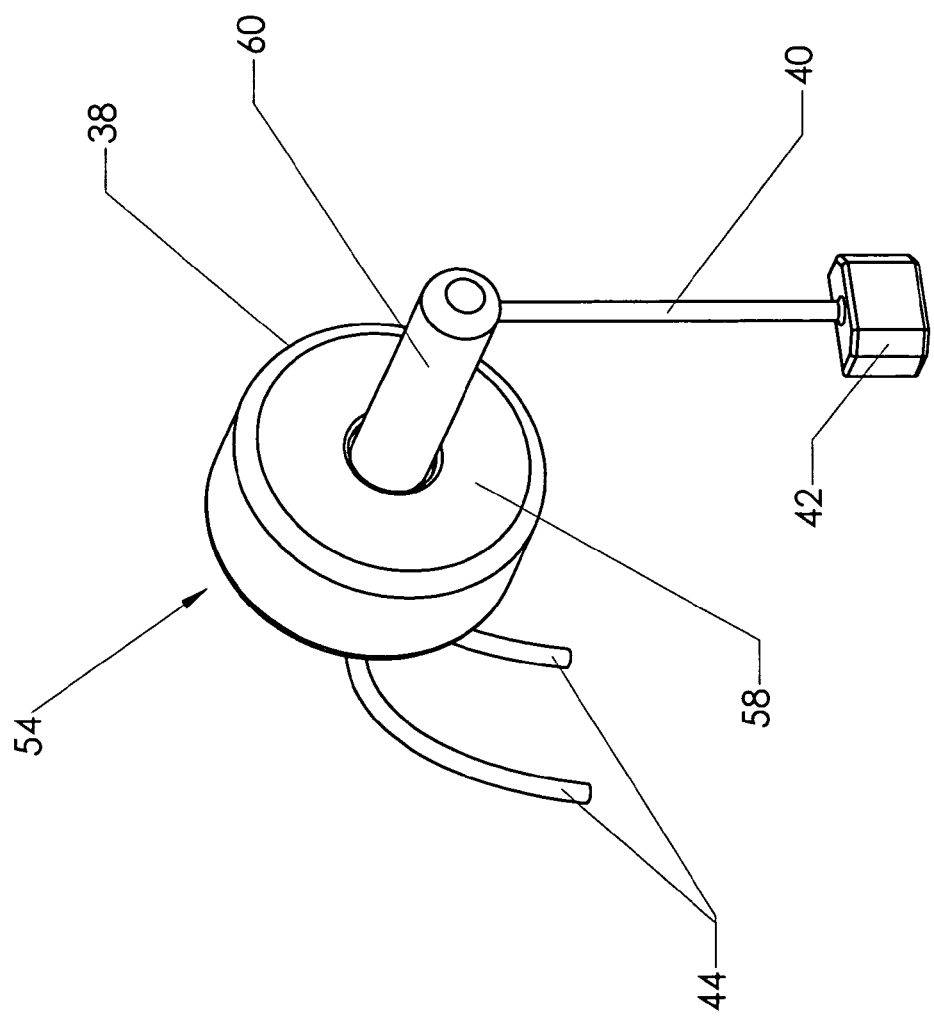
FIG. 5 is a perspective view, showing a triggering mechanism.

A triggering mechanism for activating flame effect device 10 is illustrated in FIG. 5. Triggering mechanism 54 is generally composed of potentiometer 38, pendulum 40, and mass 42. Potentiometer 38 can be any electrical component that is used to vary the current or voltage to an electric circuit. As illustrated in FIG. 5, potentiometer 38 can be a conventional potentiometer featuring dial 58 and arm 60. When arm 60 rotates clockwise with respect to dial 58 more current flows through the electric circuit. Pendulum 40 is attached to arm 60 of potentiometer 38. Mass 42 is attached to the other end of pendulum 40 as illustrated. Pendulum 40 is made of a resilient material such as metal and is firmly attached to arm 60 so that movement of pendulum 40 causes angular rotation of arm 60 with respect to dial 58. Potentiometer 38 also has leads 44 which are used to electrically connect triggering mechanism 54 to the circuit.

Those that are skilled in the art know that triggering mechanism can be made sufficiently small to be attached within flame effect device 10. For example, dial 58 can be attached to the side walls of effect module 14. Triggering mechanism 54 can also be attached to the vehicle at a different location as long as it is electrically connected to flame effect device 10 and it is positioned in such a manner that acceleration of the vehicle will cause an increase in current to the fan and light 22. This positioning of triggering mechanism 54 will be explained subsequently.

Figure 6B:
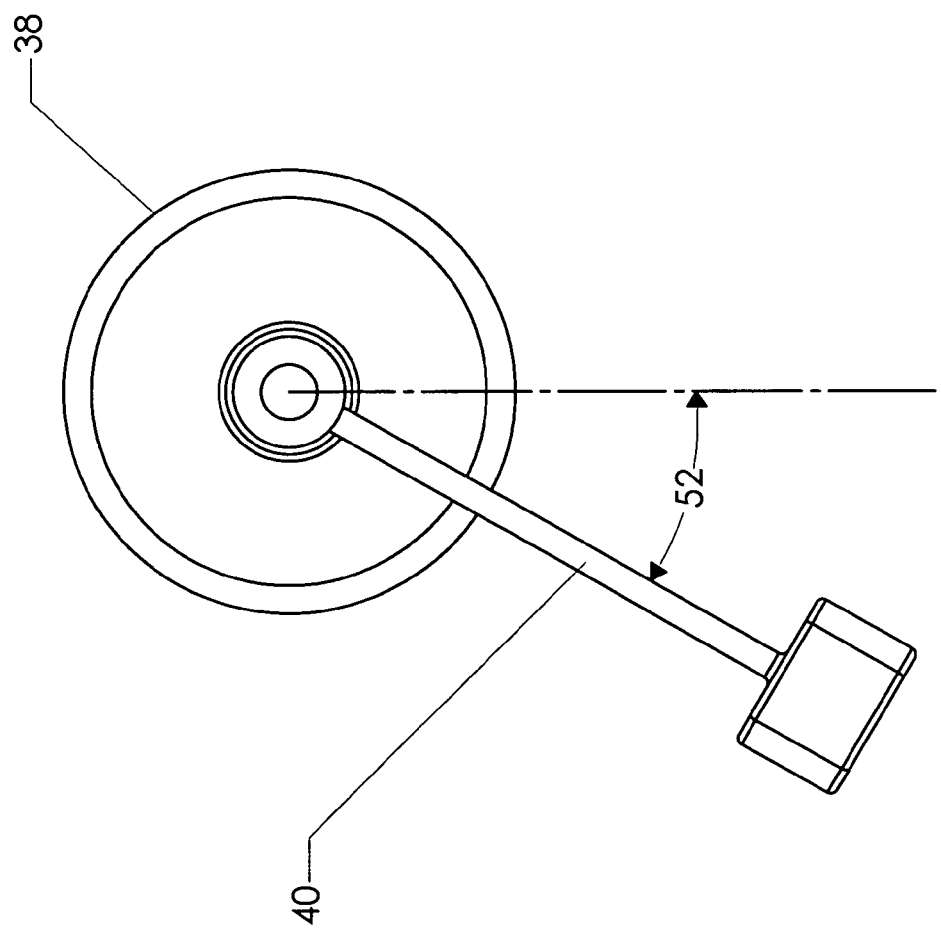
FIG. 6B is a front view, showing the triggering mechanism in the on position.

The operation of triggering mechanism 54 is shown in greater detail in FIGS. 6A and 6B. FIG. 6A shows pendulum 40 in the resting position. The reader will appreciate that pendulum 40 is in the resting position when gravity is the only force that is acting on the pendulum. In the preferred embodiment, potentiometer 38 is configured to be in the "off" position when pendulum 40 is in the resting position, i.e. no current is provided to the electric circuit. Those that are skilled in the art will know that pendulum 40 will remain in the resting position when the vehicle is stopped or is maintaining constant speed and direction. Accordingly, flame effect device 10 is deactivated when the vehicle is not accelerating.

FIG. 6B shows pendulum 40 in the swinging position. Pendulum 40 is said to be in the swinging position when there is angular displacement 52 from the resting position. Potentiometer 38 is calibrated so that as angular displacement 52 increases, the current to the electric circuit increases. The reader will now appreciate that potentiometer 38 should be positioned so that pendulum 40 can swing toward the rear of the vehicle or in the general direction of exhaust face 16.

Those that are skilled in the art will know that acceleration of the vehicle causes angular displacement 52 as the force of acceleration is transmitted from the vehicle to potentiometer 38. Accordingly, as the rate of acceleration of the vehicle increases, angular displacement 52 increases, and current to the electric circuit increases.

Figure 7:
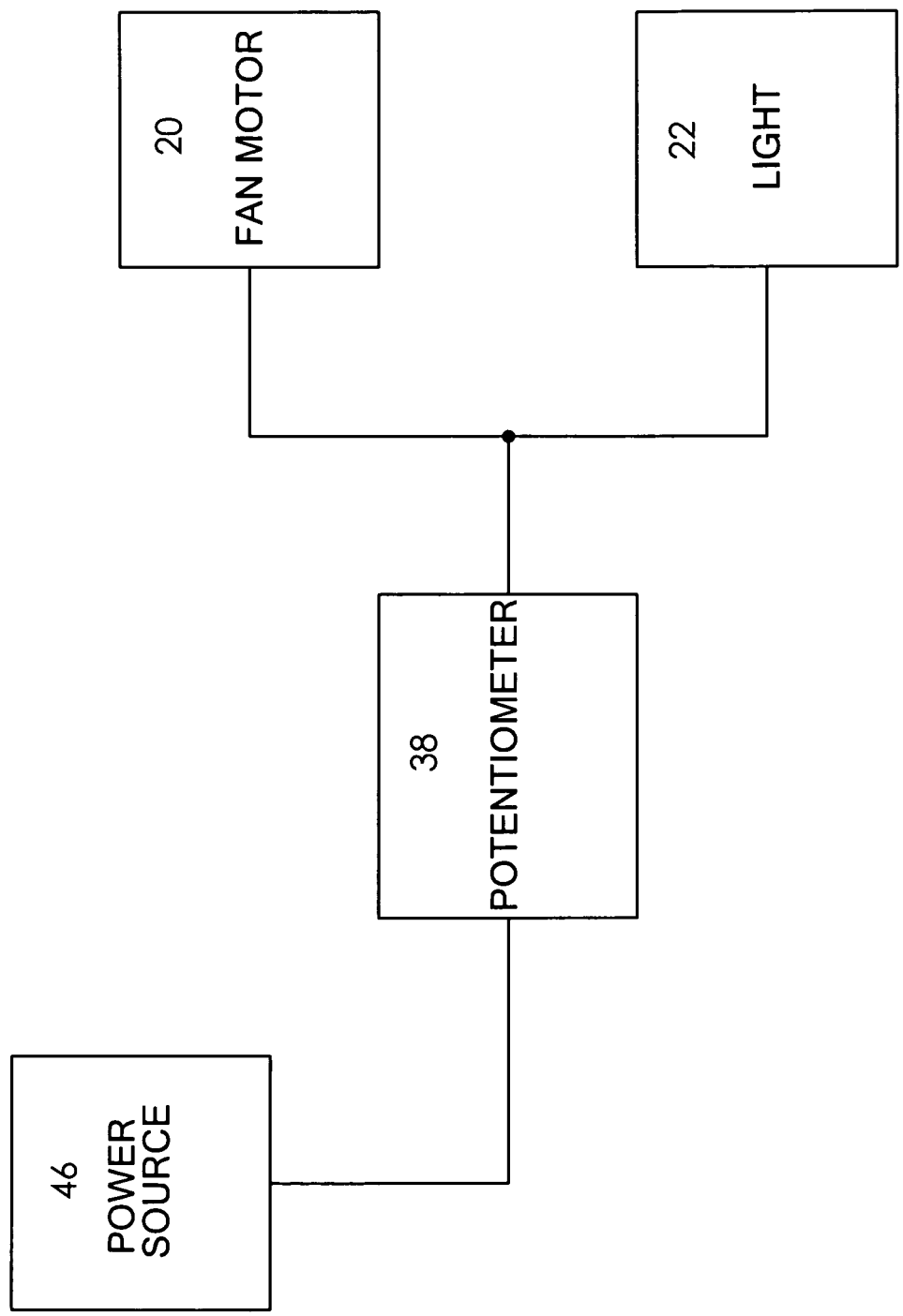
FIG. 7 is a schematic, showing the present invention.

A basic electric circuit for operation of flame effect device 10 is provided in FIG. 7. Power source 46 is electrically connected to potentiometer 38. Power source 46 can be any conventional power source. For example, power source 46 can be the battery of the vehicle or an auxiliary battery provided exclusively to operate flame effect device 10. Potentiometer 38 electrically connects power source 56 to fan motor 20 and light 22. Although potentiometer 38 is illustrated as connecting power source 56 to fan motor 20 and light 22 in parallel, fan motor 20 and light 22 can be connected to the circuit in series as well.

With the major components of the invention now described, the reader will appreciate that light 22 shines more brightly and the fan blows harder as acceleration increases. This causes flame effect 32 to appear more intense at higher acceleration rates. The change of intensity has a dramatic effect and makes flame effect 32 appear even more realistic.

Figure 8:
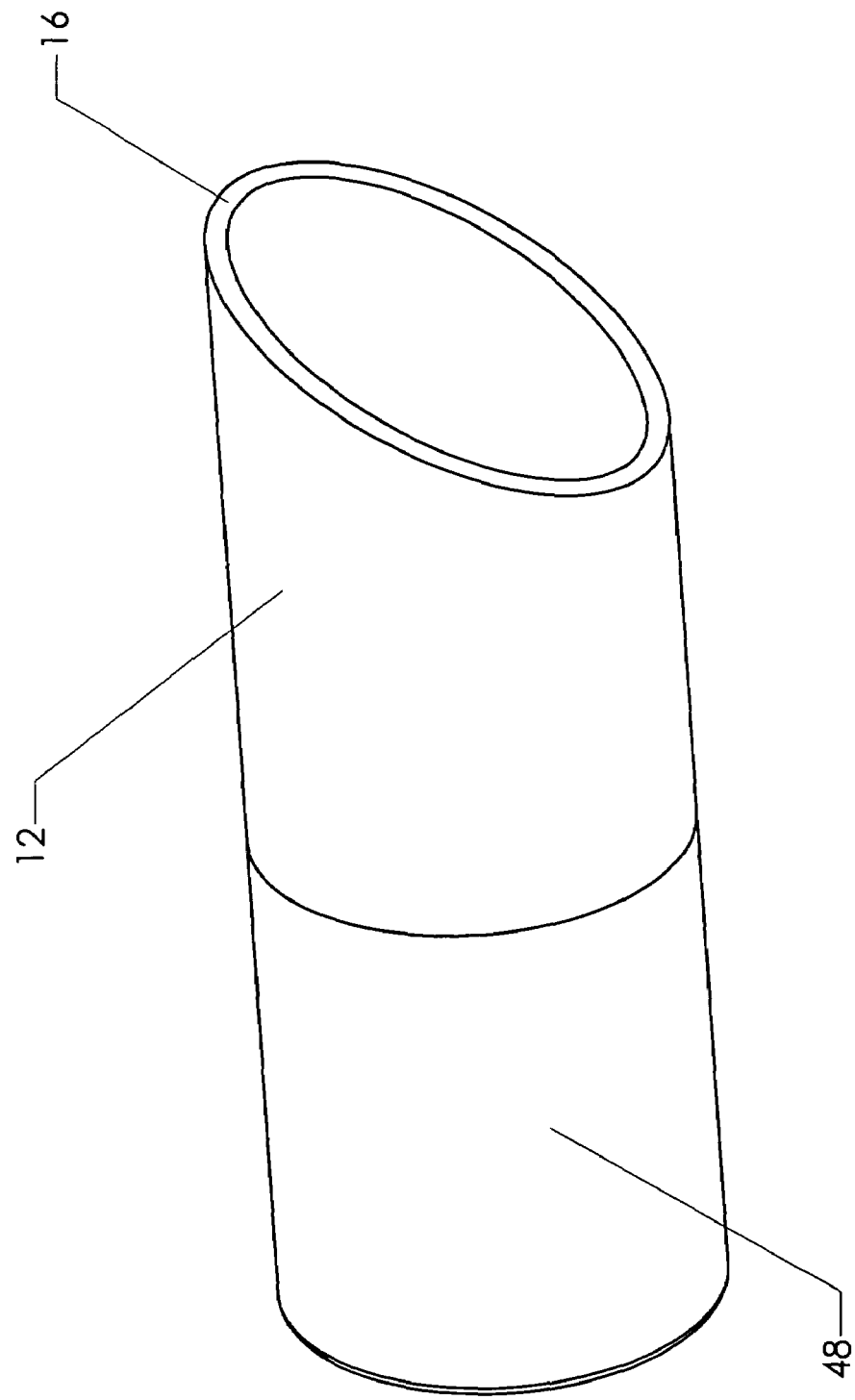
FIG. 8 is a perspective view, showing an alternate embodiment of the present invention.
Figure 9:
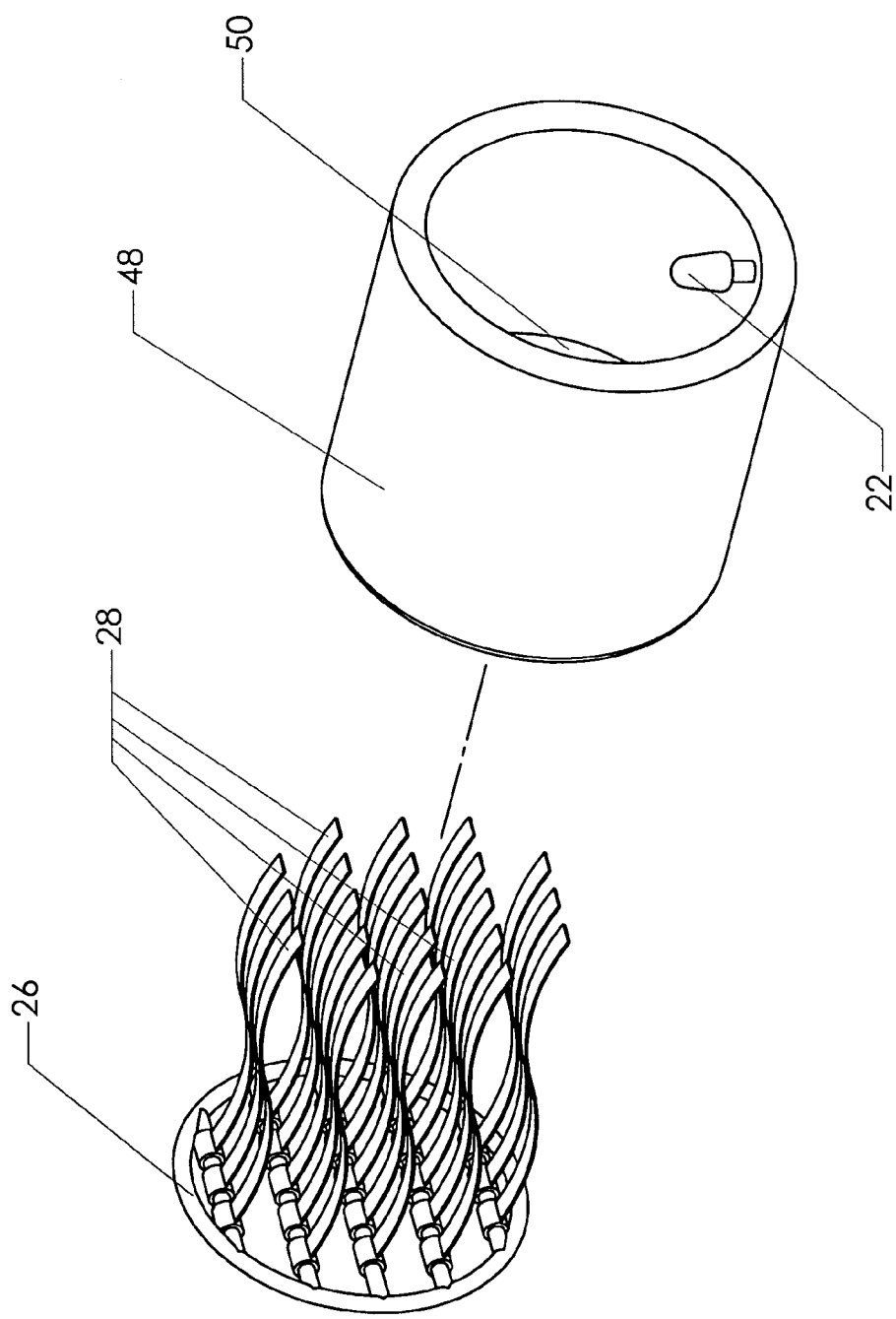
FIG. 9 is an exploded view, showing an alternate embodiment of the present invention
Figure 10:
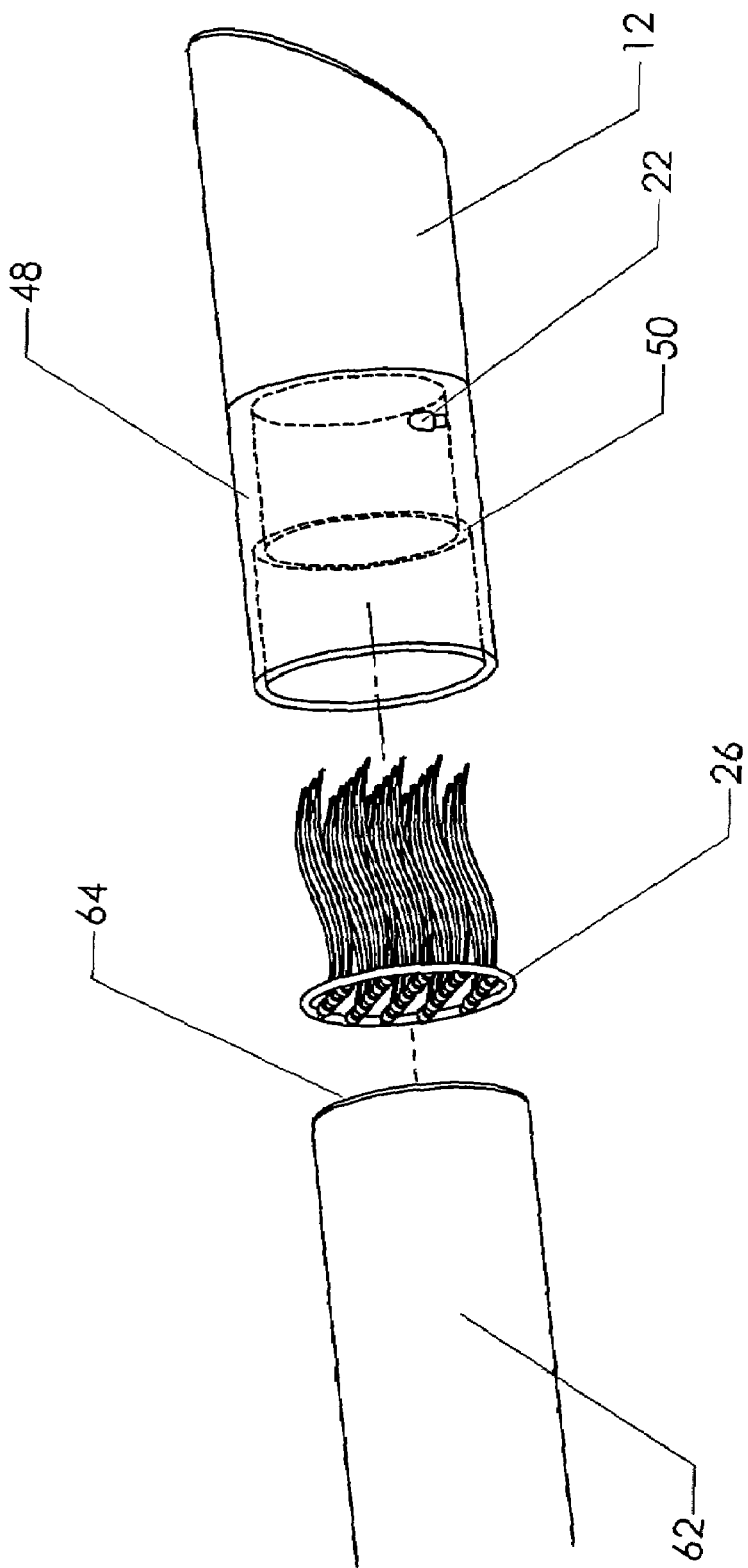
FIG. 10 is a perspective view, showing an alternate embodiment of the present invention.

Flame effect device 10 can also be integrated into the vehicle's exhaust system. One way to accomplish this is shown in FIGS. 8-10. As shown in FIG. 8, effect module 14 can be modified to function as sleeve mount 48. Sleeve mount 48 can be attached directly to the existing exhaust system of the vehicle as will be described subsequently. In FIG. 8, exhaust pipe 12 and sleeve mount 48 are joined into one integral unit.

An exploded view of the modified unit is shown in FIG. 9. Sleeve mount 48 has exhaust mating edge 50 in its interior. Exhaust mating edge 50 divides sleeve mount 48 into a section with a larger interior diameter (facing away from the viewer in this perspective) and a smaller interior diameter (facing toward the viewer in this perspective). Streamer mount 26 with streamers 28 is also provided. Streamer mount 26 can be attached to sleeve mount 48 in the same ways that streamer mount 26 can be attached to effect module 14. Light 22 is also provided in sleeve mount 48 to produce flame effect 32.

The reader will note that a fan is not required in the modified unit shown in FIGS. 8-10. The exhaust pressure of the vehicle causes streamers 28 to "flutter." As the vehicle accelerates, exhaust pressure increases causing streamers 28 to flutter more vigorously. This causes flame effect 32 to appear more intense when the vehicle accelerates.

FIG. 10 shows how sleeve mount 48 can be attached to a vehicle's exhaust system. Vehicle tail pipe 12 is inserted into sleeve mount 48 so that tail pipe face 64 mates with mating edge 50. Conventional attachment features, such as screws, can be used to ensure that sleeve mount 48 does not accidentally detach from vehicle tail pipe 62.

The preceding description contains significant detail regarding the novel aspects of the present invention. It should not be construed, however, as limiting the scope of the invention but rather as providing illustrations of the preferred embodiments of the invention. As an example, different other triggering mechanisms can be used as a substitute to triggering mechanism 54 and can be electrically connected to the circuit similar to potentiometer 38. For example, a simple electrical switch could be provided for the user to activate and deactivate flame effect device 10. Such a variation would not alter the function of the invention. Thus, the scope of the invention should be fixed by the following claims, rather than by the examples given.

Having described my invention, I claim:

1. A flame effect device for a vehicle having a tail pipe with a tail pipe face, comprising:
   a. an exhaust pipe, said exhaust pipe having a first end, a second end, a substantially cylindrical exterior, and a hollow interior;
   b. an effect module, said effect module attached to said exhaust pipe at said first end, said effect module including
      i. a light,
      ii. a streamer, said streamer having a first end and a second end, said second end of said streamer positioned between said light and said second end of said exhaust pipe; and
   c. wherein said interior of said exhaust pipe is reflective and is configured to produce a burning flame effect when said light is illuminated.

2. The flame effect device of claim 1, wherein said effect module further comprises a fan, said fan including a fan motor and an impeller and positioned distal to said second end of said exhaust pipe.

3. The flame effect device of claim 1, further comprising a triggering mechanism including:
   a. a potentiometer, said potentiometer electrically connected to said light, said potentiometer having an on position and an off position,
   b. a pendulum having a first end and a second end, said first end of said pendulum attached to said potentiometer, said pendulum having a resting position and a swinging position;
   c. a mass attached to said second end of said pendulum;
   d. wherein said potentiometer is adapted to be in said off position when said pendulum is in said resting position and said potentiometer is adapted to be in said on position when said pendulum is in said swinging position.

4. The flame effect device of claim 2, further comprising a triggering mechanism including:
   a. a potentiometer, said potentiometer electrically connected to said light, said potentiometer having an on position and an off position,
   b. a pendulum having a first end and a second end, said first end of said pendulum attached to said potentiometer, said pendulum having a resting position and a swinging position;
   c. a mass attached to said second end of said pendulum;
   d. wherein said potentiometer is adapted to be in said off position when said pendulum is in said resting position and said potentiometer is adapted to be in said on position when said pendulum is in said swinging position.

5. The flame effect device of claim 1, said effect module further comprising a streamer mount, said streamer mount positioned between said light and said second end of said exhaust pipe, wherein said first end of said streamer is attached to said streamer mount.

6. The flame effect device of claim 2, said effect module further comprising a streamer mount, said streamer mount positioned between said fan and said second end of said exhaust pipe, wherein said first end of said streamer is attached to said streamer mount.

7. The flame effect device of claim 3, said effect module further comprising a streamer mount, said streamer mount positioned between said light and said second end of said exhaust pipe, wherein said first end of said streamer is attached to said streamer mount.

8. The flame effect device of claim 4, said effect module further comprising a streamer mount, said streamer mount positioned between said fan and said second end of said exhaust pipe, wherein said first end of said streamer is attached to said streamer mount.

9. The flame effect device of claim 1, wherein said second end of said exhaust pipe has an exhaust face with a top and a bottom, and wherein said top of said exhaust face tilts further rearward than said bottom of said exhaust face.

10. The flame effect device of claim 2, wherein said second end of said exhaust pipe has an exhaust face with a top and a bottom, and wherein said top of said exhaust face tilts further rearward than said bottom of said exhaust face.

11. The flame effect device of claim 3, wherein said second end of said exhaust pipe has an exhaust face with a top and a bottom, and wherein said top of said exhaust face tilts further rearward than said bottom of said exhaust face.

12. The flame effect device of claim 1, wherein said effect module includes a sleeve mount adapted for mounting said flame effect device to said tail pipe of said vehicle.

13. The flame effect device of claim 12, said sleeve mount further comprising a mating edge, said mating edge adapted to mate with said tail pipe face of said vehicle.

14. A flame effect device for a vehicle comprising:
   a. an exhaust pipe having a first end, a second end, an exterior and an interior;
   b. a fan, said fan having a fan motor and an impeller, said fan proximal to said first end of said exhaust pipe;
   c. a streamer mount, said streamer mount positioned between said fan and said second end of said exhaust pipe
   d. a streamer, said streamer having a first end and a second end, said first end of said streamer attached to said streamer mount and said second end of said streamer extending proximal to said second end of said exhaust pipe;
   e. a light, said light positioned on the opposite side of said second end of said streamer from said second end of said exhaust pipe; and
   f. a power source, said power source electrically connected to said fan and said light.

15. The flame effect device of claim 14, further comprising a triggering mechanism including:
   a. a potentiometer, said potentiometer electrically connected to said power source, said fan, and said light, said potentiometer having an on position and an off position,
   b. a pendulum having a first end and a second end, said first end of said pendulum attached to said potentiometer, said pendulum having a resting position and a swinging position;
   c. a mass attached to said second end of said pendulum;
   d. wherein said potentiometer is adapted to be in said off position when said pendulum is in said resting position and said potentiometer is adapted to be in said on position when said pendulum is in said swinging position.

16. The flame effect device of claim 14, wherein said second end of said exhaust pipe has an exhaust face with a top and a bottom, and wherein said top of said exhaust face tilts further rearward than said bottom of said exhaust face.

* * * * *